US008058352B2

(12) United States Patent
MacKinnon et al.

(10) Patent No.: US 8,058,352 B2
(45) Date of Patent: *Nov. 15, 2011

(54) PERFLUOROCYCLOBUTANE BASED WATER VAPOR TRANSFER MEMBRANES

(75) Inventors: Sean M MacKinnon, Fairport, NY (US); Timothy J. Fuller, Pittsford, NY (US); Annette M. Brenner, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 125 days.

This patent is subject to a terminal disclaimer.

(21) Appl. No.: 12/549,881

(22) Filed: Aug. 28, 2009

(65) Prior Publication Data

US 2011/0053007 A1 Mar. 3, 2011

(51) Int. Cl.
  *H01M 8/06* (2006.01)
(52) U.S. Cl. .............. 525/326.2; 526/250; 526/252; 526/253; 526/254; 429/400; 429/413; 429/414
(58) Field of Classification Search .............. 525/326.2; 526/250, 252, 253, 254; 429/17, 26, 33, 429/34, 35, 310, 324, 400, 413, 414
See application file for complete search history.

(56) References Cited

U.S. PATENT DOCUMENTS

| | | | |
|---|---|---|---|
| 5,021,602 A | 6/1991 | Clement et al. | |
| 5,037,917 A | 8/1991 | Babb et al. | |
| 5,066,746 A | 11/1991 | Clement et al. | |
| 5,159,037 A | 10/1992 | Clement et al. | |
| 5,159,038 A | 10/1992 | Babb et al. | |
| 5,910,378 A | 6/1999 | Debe et al. | |
| 6,124,060 A | 9/2000 | Akita et al. | |
| 6,183,668 B1 | 2/2001 | Debe et al. | |
| 6,277,512 B1 | 8/2001 | Hamrock et al. | |
| 6,284,399 B1 | 9/2001 | Oko et al. | |
| 6,444,343 B1 | 9/2002 | Prakash et al. | |
| 6,523,699 B1 | 2/2003 | Akita et al. | |
| 6,559,237 B1 | 5/2003 | Mao et al. | |
| 6,783,878 B2 | 8/2004 | Voss et al. | |
| 6,847,518 B2 | 1/2005 | Fukuda et al. | |
| 6,864,005 B2 | 3/2005 | Mossman | |
| 6,875,537 B2 | 4/2005 | Tani et al. | |
| 6,884,536 B1 | 4/2005 | Hatoh et al. | |
| 6,926,984 B2 | 8/2005 | Asano et al. | |
| 6,933,068 B2 | 8/2005 | Asano et al. | |
| 6,953,653 B2 | 10/2005 | Smith et al. | |
| 6,986,962 B2 | 1/2006 | Oyanagi et al. | |
| 7,001,929 B2 | 2/2006 | Goto et al. | |
| 7,045,241 B2 | 5/2006 | Akita et al. | |
| 2001/0018144 A1 | 8/2001 | Watakabe et al. | |
| 2002/0014405 A1 | 2/2002 | Arcella et al. | |
| 2003/0017379 A1 | 1/2003 | Menashi | |
| 2004/0214058 A1 | 10/2004 | Tada et al. | |
| 2004/0214065 A1 | 10/2004 | Kanaoka et al. | |
| 2004/0241515 A1 | 12/2004 | Brenner et al. | |
| 2005/0014927 A1 | 1/2005 | Akita | |
| 2005/0043487 A1 | 2/2005 | Felix et al. | |
| 2005/0048342 A1 | 3/2005 | Wakahoi et al. | |
| 2005/0053810 A1 | 3/2005 | Kato et al. | |
| 2005/0058864 A1 | 3/2005 | Goebel | |
| 2005/0064260 A1 | 3/2005 | Otsuki et al. | |
| 2005/0100770 A1 | 5/2005 | Sugawara et al. | |
| 2005/0106440 A1 | 5/2005 | Komiya | |
| 2005/0116206 A1 | 6/2005 | Kakuta et al. | |
| 2005/0130024 A1 | 6/2005 | Otsuki et al. | |
| 2005/0142397 A1 | 6/2005 | Wakahoi et al. | |
| 2005/0143530 A1 | 6/2005 | Iwadate et al. | |
| 2005/0175886 A1 | 8/2005 | Fukuda et al. | |
| 2005/0197467 A1 | 9/2005 | Komiya et al. | |
| 2005/0227138 A1 | 10/2005 | Fukuda et al. | |
| 2005/0233181 A1 | 10/2005 | Wariishi et al. | |
| 2005/0260474 A1 | 11/2005 | Asano et al. | |
| 2006/0019147 A1 | 1/2006 | Fukuda et al. | |
| 2006/0127728 A1 | 6/2006 | Otsuki et al. | |
| 2006/0177719 A1 | 8/2006 | Fuller et al. | |
| 2007/0042242 A1 | 2/2007 | Tada et al. | |
| 2007/0099054 A1 | 5/2007 | Fuller et al. | |
| 2007/0141237 A1 | 6/2007 | Okiyama et al. | |
| 2007/0196720 A1 | 8/2007 | Skala | |
| 2008/0001313 A1 | 1/2008 | Zhang et al. | |
| 2008/0027152 A1* | 1/2008 | Maier et al. ............... | 521/25 |
| 2008/0102335 A1 | 5/2008 | Skala | |
| 2008/0182149 A1 | 7/2008 | Zhang et al. | |
| 2008/0241636 A1 | 10/2008 | Andreas-Schott et al. | |

(Continued)

FOREIGN PATENT DOCUMENTS

| | | |
|---|---|---|
| JP | 2003535929 T | 12/2003 |
| JP | 2005129298 A | 5/2005 |
| JP | 2005166557 A | 6/2005 |
| JP | 2005179380 A | 7/2005 |
| JP | 2009 249 487 A | 10/2009 |
| WO | 2004/051776 | 6/2004 |
| WO | 2007/052954 A1 | 5/2007 |

OTHER PUBLICATIONS

Smith, D.W. et al., "Perfluorocyclobutane Aromatic Polyethers. Synthesis and Characterization of New Siloxane-Containing Fluoropolymers," Macromolecules 1996, v. 29, pp. 852-860.

Smith, D.W. et al., "Perfluorocyclobutane (PFCB) polyaryl ethers: versatile coatings material," J. of Fluorine Chem., v. 104, pp. 109-117 (2000).

Souzy, R. et al., "Functional fluoropolymers for fuel cell membranes," Solid State Ionics, v. 176, pp. 2839-2848 (2005).

Souzy, R. et al., "Functional fluoropolymers for fuel cell membranes," Prog. Polm. Sci. 30, 2005, pp. 644-687.

"Fluorel Technical Data Sheets," MatWeb Material Property Data website, http://www.matweb.com/search/GetMatIsByTradename.aspx?navletter=F&tn=Fluorel%E2%84%A2, 2001. Nafion perfluorinated resin, Sigma-Aldrich Online Catalog, http://www.sigmaaldrich.com/catalog/ProductDetail.do? lang=en&N4=495786|ALDRICH&N5=SEARCH_CONCAT_PNO|BRAND_KEY&F=SPEC, 2001.

Ford, L.A. et al., "New Aromatic Perfluorovinyl Ether Monomers Containing the Sulfonimide Acid Functionality," Polymeric Materials Science & Eng., v. 83, 2000, pp. 10-11 (American Chemical Society).

(Continued)

*Primary Examiner* — Bernard Lipman
(74) *Attorney, Agent, or Firm* — Brooks Kushman P.C.

(57) ABSTRACT

A membrane humidifier assembly includes a first flow field plate adapted to facilitate flow of a first gas thereto and a second flow field plate adapted to facilitate flow of a second gas thereto. A polymeric membrane is disposed between the first and second flow fields and adapted to permit transfer of water from the first flow field plate to the second flow field plate. The polymeric membrane includes a polymer having perfluorocyclobutyl groups.

22 Claims, 5 Drawing Sheets

U.S. PATENT DOCUMENTS

| | | |
|---|---|---|
| 2009/0092863 A1 | 4/2009 | Skala |
| 2009/0278083 A1 | 11/2009 | Fuller et al. |
| 2009/0278091 A1 | 11/2009 | MacKinnon et al. |
| 2009/0281245 A1 | 11/2009 | MacKinnon et al. |
| 2009/0281262 A1 | 11/2009 | MacKinnon et al. |
| 2009/0281270 A1 | 11/2009 | Fuller et al. |

OTHER PUBLICATIONS

Souzy, R. et al., "Synthesis and (co)polymerization of monofluoro, difluoro, trifluorostyrene and ((trifluorovinyl)oxy) benzene," Prog. Polm. Sci. 29 (2004), pp. 75-106.

* cited by examiner

PERFLUOROCYCLOBUTANE BASED WATER VAPOR TRANSFER MEMBRANES

TECHNICAL FIELD

The invention relates to a fuel cell and more particularly to humidification of fuel cells.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The internal membranes used in fuel cells are typically maintained in a moist condition. This helps avoid damage to or a shortened life of the membranes, as well as to maintain the desired efficiency of operation. For example, lower water content of the membrane leads to a higher proton conduction resistance, thus resulting in a higher ohmic voltage loss. The humidification of the feed gases, in particular the cathode inlet, is desirable in order to maintain sufficient water content in the membrane, especially in the inlet region. Humidification in a fuel cell is discussed in commonly owned U.S. patent application Ser. No. 10/797,671 to Goebel et al.; commonly owned U.S. patent application Ser. No. 10/912,298 to Sennoun et al.; and commonly owned U.S. patent application Ser. No. 11/087,911 to Forte, each of which is hereby incorporated herein by reference in its entirety.

To maintain a desired moisture level, an air humidifier is frequently used to humidify the air stream used in the fuel cell. The air humidifier normally consists of a round or box type air humidification module that is installed into a housing. Examples of this type of air humidifier are shown and described in U.S. patent application Ser. No. 10/516,483 to Tanihara et al., and U.S. Pat. No. 6,471,195, each of which is hereby incorporated herein by reference in its entirety.

Membrane humidifiers have also been utilized to fulfill fuel cell humidification requirements. For the automotive fuel cell humidification application, such a membrane humidifier needs to be compact, exhibit low pressure drop, and have high performance characteristics.

Designing a membrane humidifier requires a balancing of mass transport resistance and pressure drop. To transport from wet side to dry side through a membrane, water molecules must overcome some combination of the following resistances: convectional mass transport resistance in the wet and dry flow channels; diffusion transport resistance through the membrane; and diffusion transport resistance through the membrane support material. Compact and high performance membrane humidifiers typically require membrane materials with a high water transport rate (i.e., GPU in the range of 10000-12000). GPU or gas permeation unit is a partial pressure normalized flux where 1 GPU=$10^{-6}$ $cm^3$ (STP)/($cm^2$ sec cm Hg). As a result, minimizing the transport resistance in the wet and dry flow channels and the membrane support material becomes a focus of design.

Accordingly, there is a need for improved materials and methodologies for humidifying fuel cells.

SUMMARY OF THE INVENTION

The present invention solves one or more problems of the prior art by providing in at least one embodiment a membrane humidifier for a fuel cell. The membrane humidifier of this embodiment includes a first flow field plate adapted to facilitate flow of a first gas thereto and a second flow field plate adapted to facilitate flow of a second gas thereto. The polymeric membrane is disposed between the first and second flow fields and is adapted to permit transfer of water. The polymeric membrane comprises a first polymer having perfluorocyclobutyl groups.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
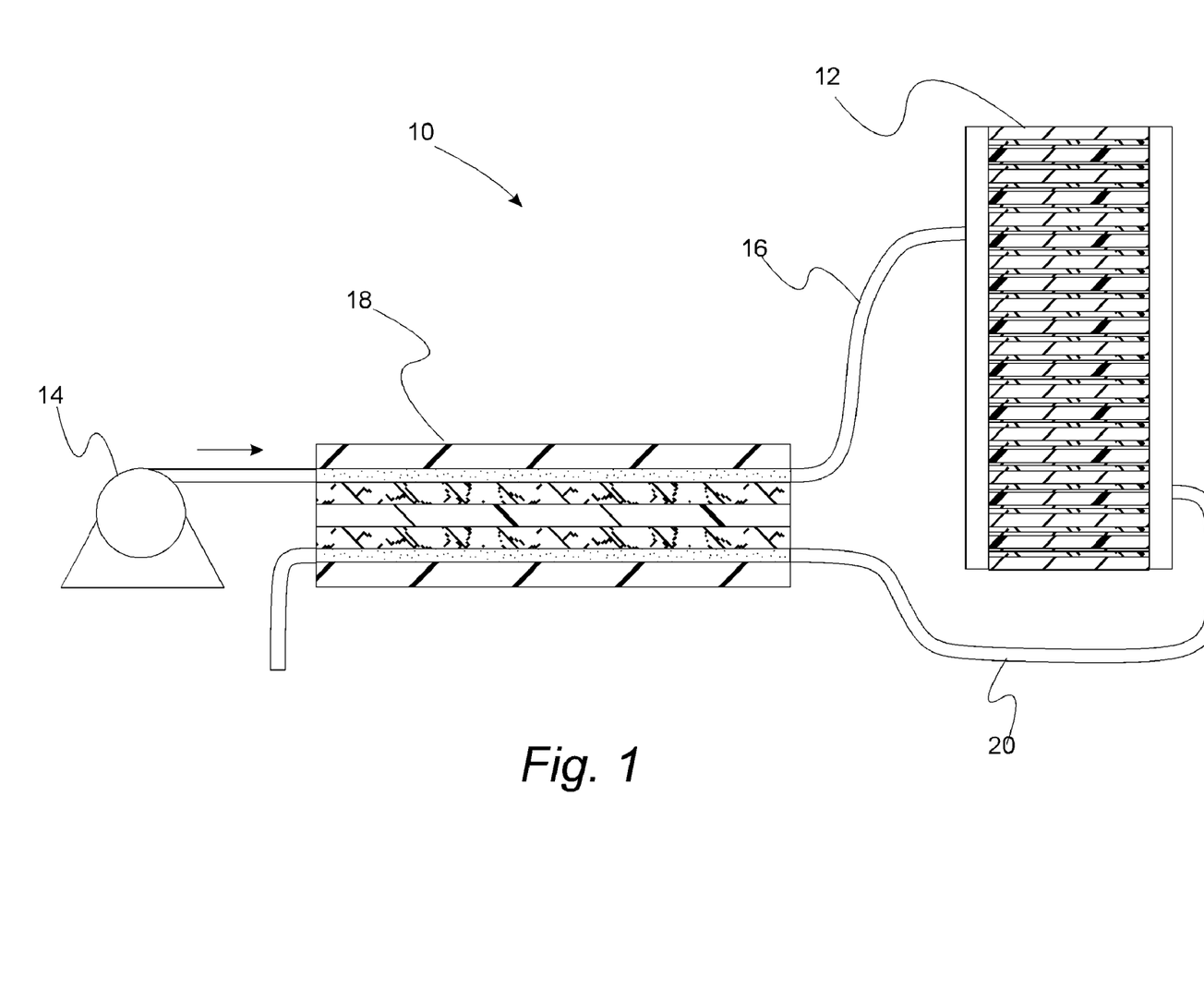
FIG. 1 is a schematic of a fuel cell system including a membrane humidifier assembly for humidifying a cathode inlet airflow to a fuel cell stack.

With reference to FIG. 1, a schematic of a fuel cell system incorporating a membrane humidifier assembly is provided. Fuel cell system 10 includes fuel cell stack 12 having a cathode side and an anode side. Compressor 14 provides a flow of air to the cathode side of the stack 12 on a cathode input line 16. The flow of air from the compressor 14 is sent through membrane humidifier assembly 18 to be humidified. A cathode exhaust gas is output from the stack 12 on a cathode output line 20. The cathode exhaust gas includes a considerable amount of water vapor and/or liquid water as a by-product of the electrochemical process in the fuel cell stack 12. As is well understood in the art, the cathode exhaust gas can be sent to membrane humidifier assembly 18 to provide the humidification for the cathode inlet air on the line 16.

Figure 2A:
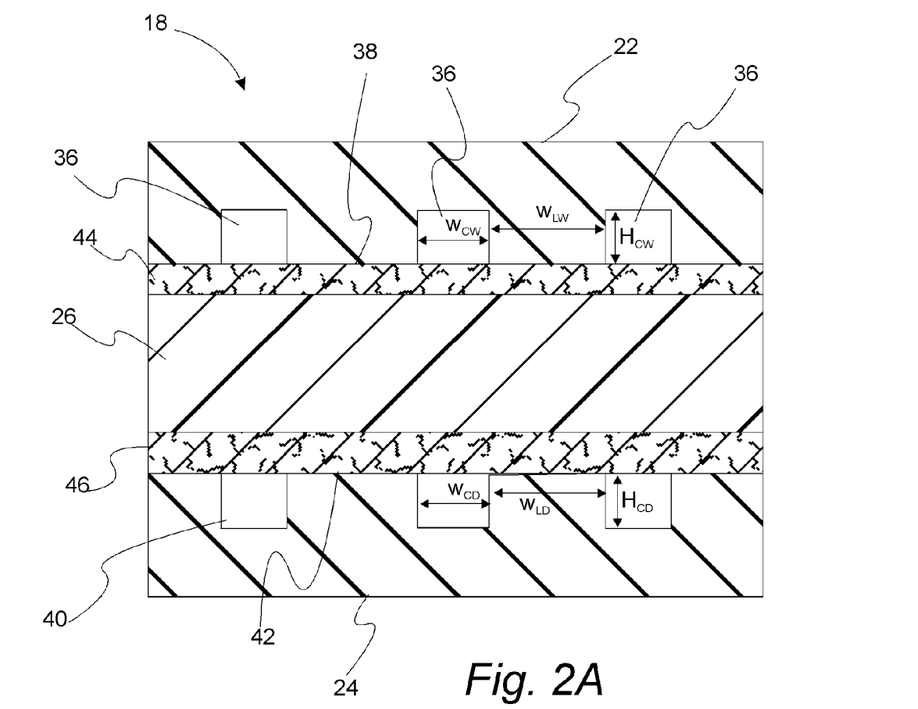
FIG. 2A is a schematic cross section of a membrane humidifier assembly perpendicular to the flow of gas to a first flow field plate.
Figure 2B:
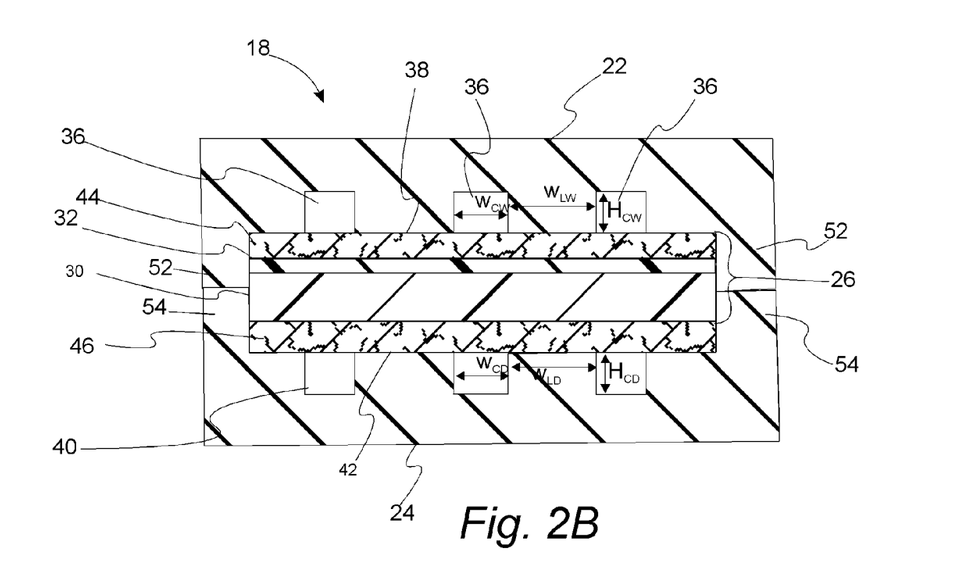
FIG. 2B is a cross section of a membrane humidifier assembly with a peripheral sealing edge.
Figure 3:
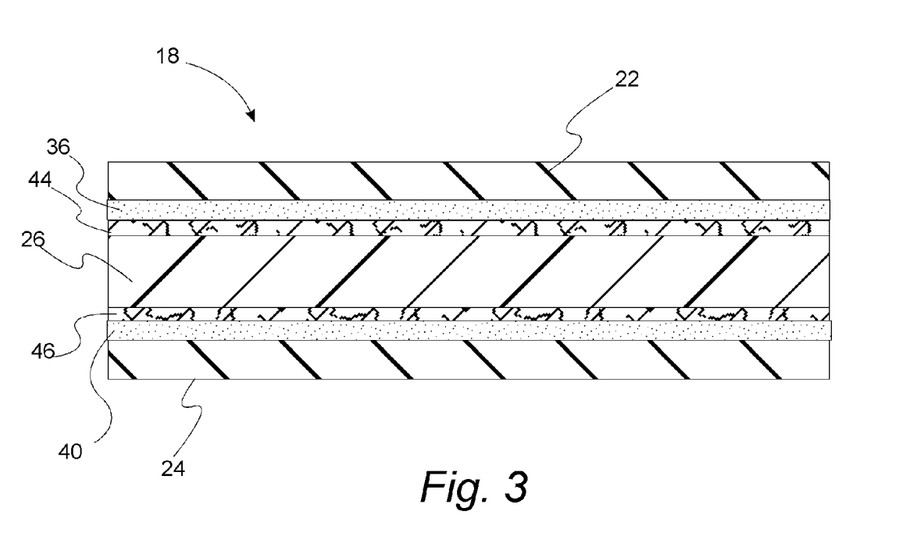
FIG. 3 is a schematic cross section of a membrane humidifier assembly perpendicular to the cross section of FIG. 2A.

With reference to FIGS. 2A, 2B, and 3, schematic cross sections of a membrane humidifier assembly are provided. The membrane humidifier of this embodiment may be used in any application in which it is desirable to transfer water from a wet gas to a dry gas such as the fuel cell system of FIG. 1. FIG. 2A is a cross section of a membrane humidifier assembly perpendicular to the flow at which dry gas is introduced. FIG. 2B is a cross section of a membrane humidifier assembly with a peripheral sealing edge. FIG. 3 is a cross section of a membrane humidifier assembly perpendicular to the cross section of FIG. 2A.

Membrane humidifier assembly 18 includes first flow field plate 22 adapted to facilitate flow of a first gas to membrane humidifier assembly 18. Membrane humidifier assembly 18 also includes second flow field plate 24 adapted to facilitate flow of a second gas thereto. In a refinement, first flow field plate 22 is a wet plate and second flow field plate 24 is a dry plate. Polymeric membrane 26 is disposed between the first flow field plate 22 and second flow field plate 24. Polymeric membrane 26 includes a first polymer having perfluorocyclobutyl (PFCB) groups as set forth below in more detail. In a refinement of the present embodiment, polymeric membrane 26 has a permeance of equal to or greater than 6000 GPU, and typically in the range of 6000-16000 GPU. Polymeric membrane 26 is adapted to permit transfer of water from the first gas to the second gas.

For the embodiment shown and described herein, the membrane humidifier assembly 18 for a cathode side of the fuel cell is described. However, it is understood that the membrane humidifier assembly 18 can be used for an anode side of the fuel cell or otherwise as desired. It should be appreciated that in a variation, a membrane humidifier assembly is provided in which the membrane of U.S. Pat. Appl. No. 2008/0001313 is replaced by polymeric membrane 26. The entire disclosure of this patent application is hereby incorporated by reference.

First flow field plate 22 includes a plurality of flow channels 36 formed therein. The channels 36 are adapted to convey a wet gas from the cathode of the fuel cell to an exhaust (not shown). In a refinement of the present embodiment, channels 36 are characterized by a width $W_{CW}$ and a depth $H_{CW}$. A land 38 is formed between adjacent channels 36 in flow field plate 24. The land 38 includes a width $W_{LW}$. It should be appreciated that any conventional material can be used to form the first flow field plate 22. Examples of useful materials include, but are not limited to, steel, polymers, and composite materials, for example.

Second flow field plate 24 includes a plurality of flow channels 40 formed therein. The channels 40 are adapted to convey a dry gas from a source of gas (not shown) to the cathode of the fuel cell. As used herein, wet gas means a gas such as air and gas mixtures of $O_2$, $N_2$, $H_2O$, $H_2$, and combinations thereof, for example, that include water vapor and/or liquid water therein at a level above that of the dry gas. Dry gas means a gas such as air and gas mixtures of $O_2$, $N_2$, $H_2O$, and $H_2$, and combinations thereof, for example, absent water vapor or including water vapor and/or liquid water therein at a level below that of the wet gas. It is understood that other gases or mixtures of gases can be used as desired. Channels 40 include a width $W_{CD}$ and a depth $H_{CD}$. A land 42 is formed between adjacent channels 40 in second flow field plate 24. The land 42 includes a width $W_{LD}$. It should be appreciated that any conventional material can be used to form the dry plate 24 such as steel, polymers, and composite materials, for example.

In a refinement of the present embodiment, $W_{CW}$ and $W_{CD}$ are each independently from about 0.5 mm to about 5 mm. In another refinement, $W_{LW}$ and $W_{LD}$ are each independently from about 0.5 mm to about 5 mm. In still another refinement, $H_{CW}$ and $H_{CD}$ are each independently from about 0.1 to about 0.5 mm. In another refinement, $H_{CW}$ and $H_{CD}$, are about 0.3 mm.

Still referring to FIGS. 2A, 2B, and 3, a diffusion medium or diffusion layer 44 is disposed adjacent the first flow field plate 22 and abuts the lands 38 thereof. Similarly, a diffusion medium or diffusion layer 46 is disposed adjacent the dry side plate 24 and abuts the lands 42 thereof. The diffusion media 44, 46 are formed from a resilient and gas permeable material such as carbon fabric, paper, polyester, and glass fiber for example. In a refinement of the present invention, diffusion media 44, 46 each independently have a thickness from about 0.05 to about 0.2 mm. In another variation, media 44, 46 each independently have a thickness from about 0.05 to about 0.15 mm. In still another variation, media 44, 46 each independently have porosity in the range of 50-95%. In yet another variation, media 44, 46 each independently have porosity from about 79 to about 90%. In another refinement, diffusion media 44, 46 are characterized by pores having a pore size from about 0.01 to about 100 micrometers. In another refinement, the pore size is from about 1 to about 50 micrometers. To mitigate against intrusion of the diffusion media 44, 46 into the channels 36, 40, which results in higher pressure drops in the channels 36, 40, it is desirable for the diffusion media 44, 46 to have a modulus of elasticity larger than 40,000 kPa, and more desirable for the modulus to be larger than 100,000 kPa.

In another variation as set forth in FIG. 2B, the first flow field plate 22 includes peripheral sealing section 52 and the second flow field plate 24 includes peripheral sealing section 54. In a refinement, sealing surface 52 completely surrounds flow field plate 22 and sealing surface 52 completely surrounds flow field plate 24.

During operation, membrane humidifier assembly 18 advantageously allows the transfer of water from wet side channels 36 to the dry side channels 40. Although operation of the present invention is not restricted to any particular theory of operation, several transport modes are believed to be involved in the functioning of membrane humidifier assembly 18. Convection mass transport of water vapor occurs in the channels 36, 40 while diffusion transport occurs through the diffusion media 44, 46. Water vapor is also transported by diffusion through the polymeric membrane 26. Additionally, if a pressure differential exists between the channels 36 and channels 40, water is transferred through polymeric membrane 26 by hydraulic forces. Temperature differences between the channels 36 and channels 40 may also affect the transport of water. Finally, there is also an enthalpy exchange between the channels 36 of the wet side plate 22 and the channels 40 of the dry side plate 24.

During operation, the wet gas is caused to flow through the channels 36 formed in first flow field plate 22. The wet gas is received from the supply of wet gas. Any conventional means can be used to deliver the wet gas to the channels 36 such as a supply header in communication with the channels 36, for example. In the embodiment depicted in FIG. 1, the wet gas is supplied from an exhaust stream from fuel cell stack 12. The wet gas exits the channels 36 to the exhaust. The dry gas is caused to flow through the channels 40 formed in the second flow field plate 24. The dry gas can be received from the supply of dry gas. Any conventional means can be used to deliver the dry gas to the channels 40 such as a supply header in communication with the channels 40, for example. The dry gas then exits the channels 40. In the embodiment depicted in FIG. 1, the dry gas is supplied from compressor 14 (not shown).

In a variation of the present embodiment, the temperature of the wet gas is typically lower than the temperature of the dry gas. The temperature of the dry air from the compressor may be about 180 degrees Celsius, and the temperature of the wet air from the fuel cell exhaust may be about 80-95 degrees Celsius. If an air cooler (not shown) is used to cool the dry air supplied from the compressor, the temperature may be in the range of 95-105 degrees Celsius. It is understood that other temperature ranges can be used without departing from the scope and spirit of the invention. As a result of the temperature difference between the wet gas and the dry gas, the dry gas is also cooled during the humidification thereof. The cooling effect also increases the relative humidity of the newly humidified gas (the dry gas), thus minimizing the drying effect of the gas on components of the fuel cell.

During flow of the wet gas through the channels 36 and the flow of the dry gas through the channels 40, the wet gas is in cross flow with the dry gas. It is understood that a counter-flow of the gas streams can also be used to facilitate the transport of water vapor from wet gas stream to the dry gas stream. For a fuel cell humidification application, the water transfer effectiveness requirement is typically low. As a result, there is little expected performance difference between counter-flow and cross-flow design.

It is useful to characterize the construction of membrane humidifier assembly 18 by defining a channel area ratio $AR_c$ by the following equation:

$$AR_c = W_C/(W_C + W_L)$$

where $W_c$ is a channel width and $W_L$ is a channel depth. In a variation, the channel area ratios $AR_c$ are in the range of 75-85% with a channel width $W_c$ of between 0.5 mm and 5 mm and channel depths between 0.1 mm and 0.5 mm. Such channel area ratios $AR_c$ and channel widths $W_c$ are chosen to maximize a membrane area utilization under the lands 38, 42 and minimize the intrusion of the membrane 26 or other structures into the flow channels 36, 40. In a refinement, flow of gas through the channels 36, 40 is laminar thereby minimizing the pressure drop through the channels 36, 40 while maximizing the water vapor transport through the diffusion media 44, 46 and the membrane 26. In another variation, the flow is turbulent through channels 36, 40.

Figure 4:
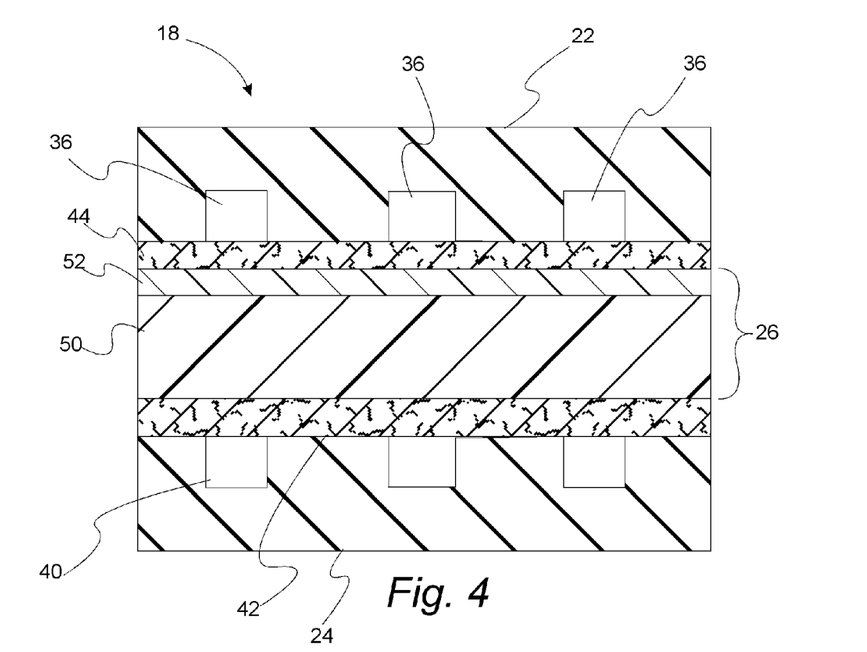
FIG. 4 is a schematic cross section of a variation of a membrane humidifier assembly perpendicular to the flow of gas to a first flow field plate.

With reference to FIG. 4, a variation of a membrane humidifier assembly 18 is provided. The membrane humidifier assembly 18 of this embodiment may be used in any application in which it is desirable to transfer water from a wet gas to a dry gas such as the fuel cell system of FIG. 1. FIG. 4 is a cross section of a membrane humidifier assembly perpendicular to the flow at which dry gas is introduced. Membrane humidifier assembly 18 includes first flow field plate 22 adapted to facilitate flow of a first gas to membrane humidifier assembly 18. Membrane humidifier assembly 18 also includes second flow field plate 24 adapted to facilitate flow of a second gas thereto. In a refinement, first flow field plate 22 is a wet plate and second flow field plate 24 is a dry plate.

A polymeric membrane 26 is disposed between the first flow field plate 22 and second flow field plate 24. Polymeric membrane 26 includes polymeric substrate 60. Polymeric layer 62 is disposed over substrate 60 and penetrates into at least a portion of polymeric substrate 60.

As set forth above, polymeric layer 62 includes perfluorocyclobutyl groups and pendant side chains as set forth below in more detail. In a refinement of the present embodiment, polymeric membrane 26 has a permeance of equal to or greater than 6000 GPU, and typically in the range of 6000-16000 GPU. Polymeric membrane 26 is adapted to permit transfer of water from the first gas to the second gas. For the embodiment shown and described herein, the membrane humidifier assembly 18 for a cathode side of the fuel cell is described. However, it is understood that the membrane humidifier assembly 18 can be used for an anode side of the fuel cell or otherwise as desired.

It should be appreciated that in a variation, membrane humidifier assembly 18 is provided in which the membrane of U.S. Pat. Appl. No. 2008/0001313 is replaced by polymeric membrane 26. The entire disclosure of this patent application is hereby incorporated herein by reference. Membrane humidifier assembly 18 also includes diffusion media 44, 46 as set forth above. Moreover, the construction of first flow field plate 22 and second flow field plate 24 are the same as that set forth above.

Figure 5:
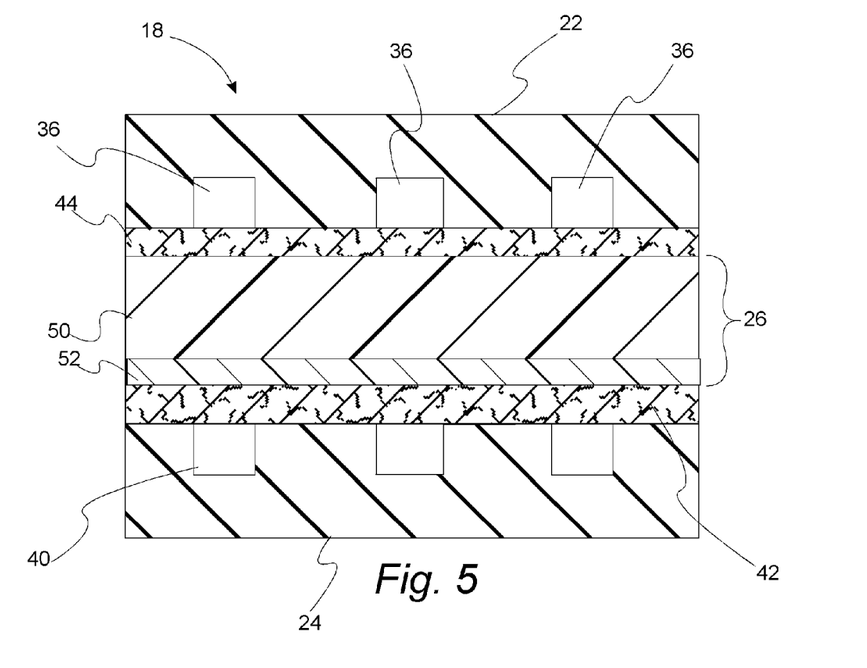
FIG. 5 is a schematic cross section of a variation of a membrane humidifier assembly perpendicular to the flow of gas to a first flow field plate.

In this variation, substrate 60 includes sufficient porosity so that polymeric layer 62 is imbibed therein during formation. Therefore, substrate 60 is characterized by a predetermined void volume. Typically, the void volume is from 30 volume percent to 95 volume percent of the total volume of substrate 60. Substrate 60 may be formed from virtually any polymeric material having the requisite void volume. Expanded polytetrafluoroethane is particularly useful for this application. In a refinement, polymeric layer 62 only partially penetrates into substrate 60 as in the specific example depicted in FIGS. 4 and 5. In another refinement, the penetration of polymeric layer 62 into substrate 60 is substantially complete. FIG. 5 provides a similar construction to that depicted in FIG. 4 except that polymer layer 62 is on the dry side.

As set forth above, polymeric membrane 26 includes a first polymer having perfluorocyclobutyl moieties. Suitable polymers having cyclobutyl moieties are disclosed in U.S. Pat. Pub. No. 2007/0099054, U.S. patent application Ser. No. 12/197,530 filed Aug. 25, 2008; Ser. No. 12/197,537 filed Aug. 25, 2008; Ser. No. 12/197,545 filed Aug. 25, 2008; and Ser. No. 12/197,704 filed Aug. 25, 2008; the entire disclosures of which is hereby incorporated by reference. In a variation, the first polymer has a polymer segment comprising polymer segment 1:

1 wherein:

$E_o$ is a moiety having a protogenic group such as —SO$_2$X, —PO$_3$H$_2$, —COX, and the like;

$P_1$, $P_2$ are each independently: absent, —O—, —S—, —SO—, —CO—, —SO$_2$—, —NH—, NR$_2$—, or —R$_3$—;

$R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

X is an —OH, a halogen, an ester, or $R_4$ is trifluoromethyl, $C_{1-25}$ alkyl, $C_{1-25}$ perfluoroalkylene, $C_{1-25}$ aryl, or $E_1$ (see below); and $Q_1$ is a fluorinated cyclobutyl moiety.

In variation of the present invention, the first polymer comprises polymer segments 2 and 3:

2

3 wherein:

$Z_1$ is a protogenic group such as —SO$_2$X, —PO$_3$H$_2$, —COX, and the like;

$E_1$ is an aromatic containing moiety;

$E_2$ is an unsulfonated aromatic-containing and/or aliphatic-containing moiety;

X is an —OH, a halogen, an ester, or d is the number of $Z_1$ attached to $E_1$;

$P_1$, $P_2$, $P_3$, $P_4$ are each independently absent, —O—, —S—, —SO—, —CO—, —SO$_2$—, —NH—, NR$_2$—, or —R$_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety.

In one refinement, d is equal to the number of aromatic rings in $E_1$. In another refinement, each aromatic ring in $E_1$ can have 0, 1, 2, 3, or 4 $Z_1$ groups.

In another variation of the present embodiment, the first polymer comprises segments 4 and 5:

4
     5 wherein:

$Z_1$ is a protogenic group such as —SO$_2$X, —PO$_3$H$_2$, —COX, and the like;

$E_1$, $E_2$ are each independently an aromatic-containing and/or aliphatic-containing moiety;

X is an —OH, a halogen, an ester, or d is the number of $Z_1$ attached to $R_8$;

$P_1$, $P_2$, $P_3$, $P_4$ are each independently absent, —O—, —S—, —SO—, —CO—, —SO$_2$—, —NH—, NR$_2$—, or —R$_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and $Q_1$, $Q_2$ are each independently a fluorinated cyclobutyl moiety.

In a refinement of this variation, $R_8$ is $C_{1-25}$ alkylene, $C_{1-25}$ perfluoroalkylene, perfluoroalkyl ether, alkylether, or $C_{1-25}$ arylene. In one refinement, d is equal to the number of aromatic rings in $R_8$. In another refinement, each aromatic ring in $R_8$ can have 0, 1, 2, 3, or 4 $Z_1$ groups. In still another refinement, d is an integer from 1 to 4 on average.

In another variation of the present embodiment, the first polymer comprises segments 6 and 7:

$$E_1(SO_2X)_d\text{—}P_1\text{-}Q_1\text{-}P_2 \qquad 6$$

$$E_2\text{-}P_3\text{-}Q_2\text{-}P_4 \qquad 7$$

connected by a linking group $L_1$ to form polymer units 8 and 9:

$$\text{—}(E_2\text{-}P_3\text{-}Q_2\text{-}P_4)_j\text{—}L_1\text{—}(E_1(SO_2X)_d\text{-}P_1\text{-}Q_1\text{-}P_2)_i\text{—} \qquad 8$$

$$\text{—}(E_1(Z_1)_d\text{-}P_1\text{-}Q_1\text{-}P_2)_i\text{—}L_1\text{—}(E_2\text{-}P_3\text{-}Q_2\text{-}P_4)_j\text{—} \qquad 9$$

wherein:

$Z_1$ is a protogenic group such as $-SO_2X$, $-PO_3H_2$, $-COX$, and the like;

$E_1$ is an aromatic-containing moiety;

$E_2$ is an unsulfonated aromatic-containing and/or aliphatic-containing moiety;

$L_1$ is a linking group;

X is an —OH, a halogen, an ester, or $$-\overset{H}{N}-\overset{\overset{O}{\|}}{\underset{\underset{O}{\|}}{S}}-R_4;$$

d is a number of $Z_1$ functional groups attached to $E_1$;

$P_1$, $P_2$, $P_3$, $P_4$ are each independently absent, —O—, —S—, —SO—, —SO$_2$—, —CO—, —NH—, NR$_2$—, —R$_3$—, and $R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing the repetition of polymer segment 6 with I typically being from 1 to 200; and j is a number representing the repetition of a polymer segment 7 with j typically being from 1 to 200. In one refinement, d is equal to the number of aromatic rings in $E_1$. In another refinement, each aromatic ring in $E_1$ can have 0, 1, 2, 3, or 4 $Z_1$ groups.

In still another variation of the present embodiment, the first polymer comprises polymer segments 10 and 11:

$$E_1(Z_1)_d\text{—}P_1\text{-}Q_1\text{-}P_2 \qquad 10$$

$$E_2(Z_1)_f\text{—}P_3 \qquad 11$$

wherein:

$Z_1$ is a protogenic group such as $-SO_2X$, $-PO_3H_2$, $-COX$, and the like;

$E_1$, $E_2$ are each independently an aromatic or aliphatic-containing moiety wherein at least one of $E_1$ and $E_2$ includes an aromatic containing moiety substituted with $Z_1$;

X is an —OH, a halogen, an ester, or $$-\overset{H}{N}-\overset{\overset{O}{\|}}{\underset{\underset{O}{\|}}{S}}-R_4;$$

d is the number of $Z_1$ functional groups attached to $E_1$;

f is the number of $Z_1$ functional groups attached to $E_2$;

$P_1$, $P_2$, $P_3$ are each independently absent, —O—, —S—, —SO—, —SO$_2$—, —CO—, —NH—, NR$_2$—, or —R$_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety, with the proviso that when d is greater than zero, f is zero and when f is greater than zero, d is zero. In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average. In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average. In a variation, polymer segments 10 and 11 are each independently repeated 1 to 10,000 times to form respective polymer blocks that may be joined with a linking group $L_1$ shown below.

Example for $Q_1$ and $Q_2$ in the above formulae are:

[Structures of fluorinated cyclobutyl moieties with F substituents]

In each of the formulae 1-10, $E_1$ and $E_2$ include one or more aromatic rings. For example, $E_1$ and $E_2$, include one or more of the following moieties:

[Structures of aromatic moieties including phenylene, biphenylene, terphenylene, naphthylene, phenanthrenylene, and diphenyl ether]

Examples of $L_1$ include the following linking groups:

where $R_5$ is an organic group, such as an alkyl or acyl group.

In another embodiment of the present invention, polymeric membrane 26 includes a polymer blend. The polymer blend of this embodiment includes a first polymer and a second polymer. The first polymer includes the polymer segment 1 set forth above. The first polymer is different than the second polymer. In one variation, the second polymer is a non-ionic polymer. In a refinement, the non-ionic polymer is a fluorine-containing polymer such as a fluoro-elastomer or fluoro-rubber.

The fluoro-elastomer may be any elastomeric material comprising fluorine atoms. The fluoro-elastomer may comprise a fluoropolymer having a glass transition temperature below about 25° C. or preferably, below 0° C. The fluoro-elastomer may exhibit an elongation at break in a tensile mode of at least 50% or preferably at least 100% at room temperature. The fluoro-elastomer is generally hydrophobic and substantially free of ionic groups. The fluoro-elastomer may be prepared by polymerizing at least one fluoro-monomer such as vinylidene fluoride, tetrafluoroethylene, hexafluoropropylene, vinylfluoride, vinylchloride, chlorotrifluoroethylene, perfluoromethylvinyl ether, and trifluoroethylene. The fluoro-elastomer may also be prepared by copolymerizing at least one fluoro-monomer and at least one non-fluoro-monomer such as ethylene, propylene, methyl methacrylate, ethyl acrylate, styrene and the like. The fluoro-elastomer may be prepared by free radical polymerization or anionic polymerization in bulk, emulsion, suspension and solution.

Examples of fluoro-elastomers include poly(tetrafluoroethylene-co-ethylene), poly(vinylidene fluoride-co-hexafluoropropylene), poly(tetrafluoroethylene-co-propylene), terpolymer of vinylidene fluoride, hexafluoropropylene and tetrafluoroethylene, and terpolymer of ethylene, tetrafluoroethylene and perfluoromethylvinylether. Some of the fluoro-elastomers are commercially available from Arkema under trade name Kynar Flex® and Solvay Solexis under the trade name Technoflon®, from 3M under the trade name Dyneon®, and from DuPont under the trade name Viton®. For example, Kynar Flex 2751 is a useful copolymer of vinylidene fluoride and hexafluoropropylene with a melting temperature between about 130° C. and 140° C. The glass transition temperature of Kynar Flex 2751 is about −40 to −44° C. The fluoro-elastomer may further comprise a curing agent to allow crosslinking reaction after being blended with a first polymer that includes a perfluorocyclobutyl moiety.

In another variation of this embodiment, the second polymer is a perfluorosulfonic acid polymer (PFSA). In a refinement, such PFSAs are a copolymer containing a polymerization unit based on a perfluorovinyl compound represented by:

$$CF_2=CF-(OCF_2CFX^1)_m-O_r-(CF_2)_q-SO_3H$$

where m represents an integer of from 0 to 3, q represents an integer of from 1 to 12, r represents 0 or 1, and $X^1$ represents a fluorine atom or a trifluoromethyl group and a polymerization unit based on tetrafluoroethylene.

In a variation of this embodiment, the second polymer is present in an amount from about 5 to about 70 weight percent of the total weight of the polymer blend. In a further refinement, the second polymer is present in an amount from about 10 to about 60 weight percent of the total weight of the polymer blend. In still another refinement, the polymer having polymer segment 1 is present in an amount from about 30 to about 95 weight percent of the total weight of the polymer blend. In still another refinement, the polymer having polymer segment 1 (i.e., the first polymer) is present in an amount from about 40 to about 90 weight percent of the total weight of the polymer blend.

The following examples illustrate the various embodiments of the present invention. Those skilled in the art will recognize many variations that are within the spirit of the present invention and scope of the claims.

Table 1 provides a set of membranes used to evaluate the performance of membrane humidifier assemblies made in accordance with embodiments set forth above.

TABLE 1

| | | |
|---|---|---|
| Comparative Example 1 | 25 μm PFSA baseline | |
| Example 2 | Free Standing Film | |
| Example 3 | Method 1 single sided composite | laid down ePTFE |
| Example 4 | Method 2 dual layer composite | cast on ePTFE with second ePTFE laid down |

Example 1

PFSA Baseline

A membrane using a standard perfluorosulfonic acid polymer membrane is used as a baseline.

Example 2

Free-Standing Film

Aryl Sulfonated Perfluorocyclobutyl Ionomer Blend

A 10 wt % solution (i.e., PFCB solution), in N,N-dimethylacetamide is prepared using a sulfonated segmented block copolymer prepared from the reaction of chlorosulfonic acid with the perfluorocyclobutyl polymer (~90,000 Mw) of a 16,000 Mw biphenyl perfluorocyclobutane oligomer and a hexafluoroisopropylidene-bis-trifluorovinyl ether monomer. A blend solution is prepared by adding 3 g of a 10 wt % solution of Kynar Flex 2751 in N,N-dimethylacetamide to 7 g of the 10 wt % PFCB solution. The 10 wt % solution is then coated on a clean sheet of extruded Teflon® at 50° C. and dried over a 15 minute period. The resultant single layer composite membrane film could be peeled from the clean sheet of extruded Teflon® and used as a water vapor transfer membrane in a humidified, hydrogen-air fuel cell that is operated at less than 100° C.

Example 3

Method 1 Single Layer Composite

Aryl Sulfonated Perfluorocyclobutyl Ionomer Blend on Polytetrafluoroethylene Support Structure A 5 wt % solution, in N,N-dimethylacetamide is prepared using a sulfonated segmented block copolymer prepared from the reaction of chlorosulfonic acid with the perfluorocyclobutyl polymer (~90,000 Mw) of a 16,000 Mw biphenyl perfluorocyclobutane oligomer and a hexafluoroisopropylidene-bis-trifluorovinyl ether monomer. A blend solution is prepared by adding 3 g of a 5 wt % solution of Kynar Flex 2751 in N,N-dimethylacetamide to 7 g of the 5 wt % PFCB solution. The 5 wt % solution is then coated on a clean sheet of extruded Teflon® at 50° C. and the ePTFE support (example Donaldson 1326) is laid-down on top of the wet layer such that the solution is able to contact the porous support. The ePTFE structure remains opaque and the wet-film is dried over a 15 minute period. The resultant single layer composite membrane film could be peeled from the clean sheet of extruded Teflon® and used as a water vapor transfer membrane in a humidified, hydrogen-air fuel cell that is operated at less than 100° C.

Example 4

Method 2 Dual Layer Composite

Aryl Sulfonated Perfluorocyclobutyl Ionomer Blend on Polytetrafluoroethylene Support Structure A 5 wt % solution, in N,N-dimethylacetamide is prepared using a sulfonated segmented block copolymer prepared from the reaction of chlorosulfonic acid with the perfluorocyclobutyl polymer (~90,000 Mw) of a 16,000 Mw biphenyl perfluorocyclobutane oligomer and a hexafluoroisopropylidene-bis-trifluorovinyl ether monomer. A blend solution is prepared by adding 3 g of a 5 wt % solution of Kynar Flex 2751 in N,N-dimethylacetamide to 7 g of the 5 wt % PFCB solution. The ePTFE support (example Donaldson 1326) is placed in contact with a clean sheet of extruded Teflon® at 50° C., wet homogeneously with isopropanol and dried. The 5 wt % perfluorocyclobutly ionomer blend solution is coated on the porous ePTFE support and a second ePTFE support (example Donaldson 1326) is laid-down on top of the wet layer such that the solution is able to contact the porous support. The ePTFE structures remain opaque and the wet-film is dried over a 15 minute period. The resultant dual layer composite membrane film could be peeled from the clean sheet of extruded Teflon® and used as a water vapor transfer membrane in a humidified, hydrogen-air fuel cell that is operated at less than 100° C.

Experimental Results

Figure 6:
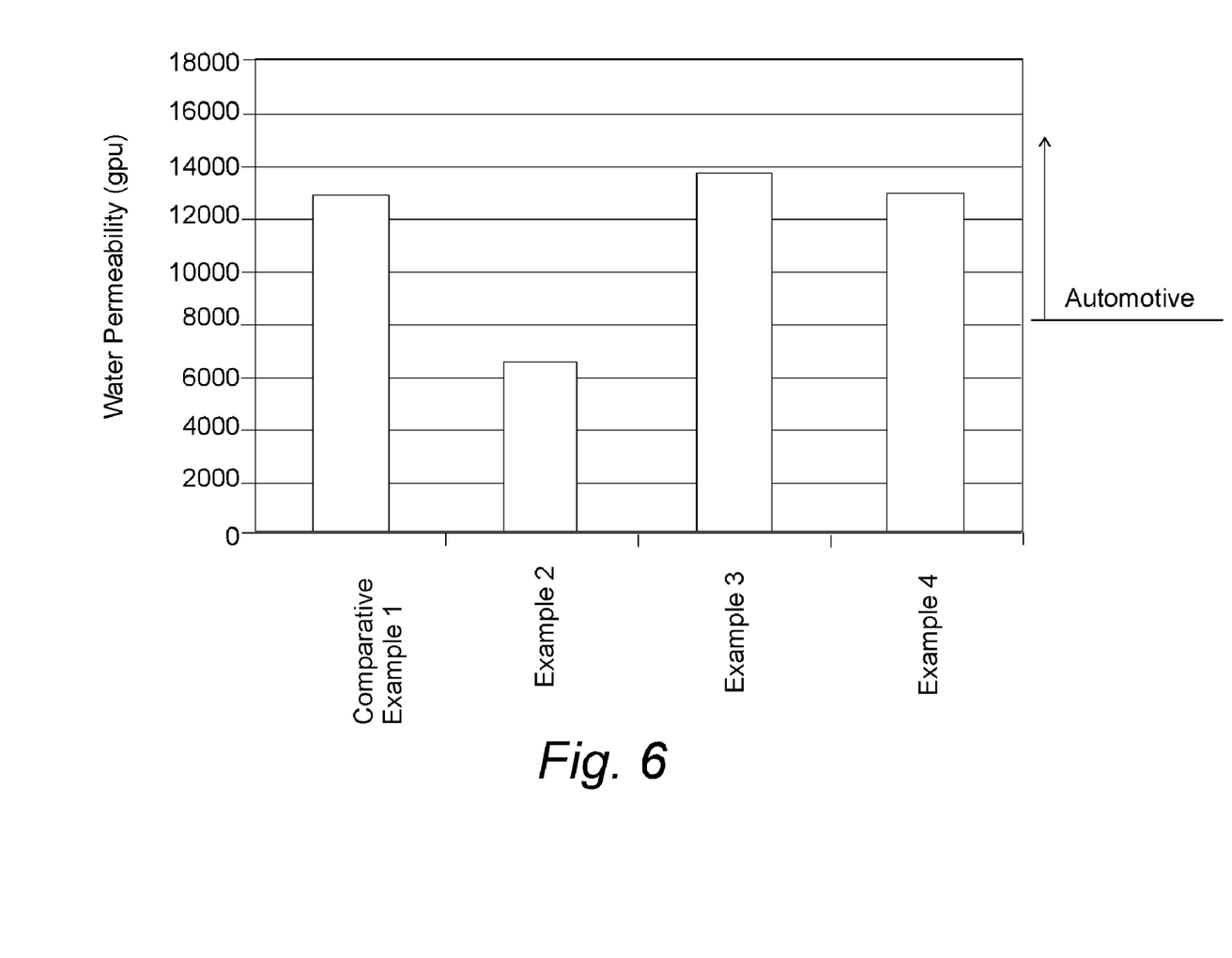
FIG. 6 is a bar chart providing performance information for the various humidifier membranes.

FIG. 6 provides experimental results at a common screening point for materials for water vapor transfer within a humidified, hydrogen-air fuel cell system. Grams of water transferred across the membrane are measured for a 50 cm$^2$ sample from a wet inlet stream of 80° C., 85% relative humidity, 10 slpm dry gas flow, and 160 kPaa to a dry inlet stream of 80° C., 0% relative humidity, 11.5 slpm dry gas flow, 80° C., and 183 kPaa. It is clear, that the humidifiers of the invention exhibit significantly improved performance compared to humidifiers using Nafion®.

The above description of embodiments of the invention is merely exemplary in nature and, thus, variations thereof are not to be regarded as a departure from the spirit and scope of the invention.

What is claimed is:

1. A membrane humidifier for a fuel cell, the membrane humidifier comprising:
    a first flow field plate adapted to facilitate flow of a first gas thereto;
    a second flow field plate adapted to facilitate flow of a second gas thereto; and
    a polymeric membrane disposed between the first and second flow fields, the membrane adapted to permit transfer of water, the polymeric membrane comprising a first polymer having a polymer segment comprising polymer segment 1:

$$E_0\text{-}P_1\text{-}Q_1\text{-}P_2 \qquad 1$$

wherein:
    $E_o$ is moiety having a protogenic group;
    $P_1$, $P_2$ are each independently absent, —O—, —S—, —SO—, —CO—, —SO$_2$—, —NH—, —NR$_2$—, or —R$_3$—;
    $R_2$ is $C_{1-25}$ alkyl, $C_{1-25}$ aryl or $C_{1-25}$ arylene;
    $R_3$ is $C_{1-25}$ alkylene, $C_{1-25}$ perfluoroalkylene, perfluoroalkyl ether, alkylether, or $C_{1-25}$ arylene; and
    $Q_1$ is a fluorinated cyclobutyl moiety.

2. The humidifier of claim 1 wherein the first gas and the second gas each independently include a component selected from the group consisting of O$_2$, N$_2$, H$_2$O, H$_2$, and combinations thereof.

3. The humidifier of claim 1 wherein the polymeric membrane has a permeance of greater than 6000 GPU.

4. The humidifier of claim 1 wherein the first flow field plate and the second flow field plate each independently include a peripheral sealing section.

5. The humidifier of claim 1 wherein polymer segment 1 is repeated from 1 to 10,000 times.

6. The humidifier of claim 1 wherein the protogenic groups is SO$_2$X, —PO$_3$H$_2$, or —COX and X is an —OH, a halogen, an ester, or $$-\underset{\underset{H}{|}}{N}-\underset{\underset{O}{\|}}{\overset{\overset{O}{\|}}{S}}-R_4; \text{ and}$$

$R_4$ is trifluoromethyl, $C_{1-25}$ alkyl, $C_{1-25}$ perfluoroalkylene, $C_{1-25}$ aryl, or another $E_1$ group.

7. The humidifier of claim 1 wherein the polymeric membrane comprises polymer segments 2 and 3:

$$[E_1(Z_1)_d]\text{-}P_1\text{-}Q_1\text{-}P_2 \qquad 2$$

$$E_2\text{-}P_3\text{-}Q_2\text{-}P_4 \qquad 3$$

wherein:
    $Z_1$ is —SO$_2$X, —PO$_3$H$_2$, or —COX;
    $E_1$ is an aromatic containing moiety;
    $E_2$ is an unsulfonated aromatic-containing and/or aliphatic-containing moiety;
    X is an —OH, a halogen, an ester, or $$-\underset{\underset{H}{|}}{N}-\underset{\underset{O}{\|}}{\overset{\overset{O}{\|}}{S}}-R_4;$$

d is the number of $Z_1$ attached to $E_1$;
$P_1$, $P_2$, $P_3$, $P_4$ are each independently absent, —O—, —S—, —SO—, —CO—, —SO$_2$—, —NH—, NR$_2$—, or —R$_3$—;
$R_2$ is $C_{1-25}$ alkyl, $C_{1-25}$ aryl, or $C_{1-25}$ arylene;
$R_3$ is $C_{1-25}$ alkylene, $C_{1-25}$ perfluoroalkylene, perfluoroalkyl ether, alkylether, or $C_{1-25}$ arylene;
$R_4$ is trifluoromethyl, $C_{1-25}$ alkyl, $C_{1-25}$ perfluoroalkylene, $C_{1-25}$ aryl, or another $E_1$ group; and
$Q_1$, $Q_2$ are each independently a fluorinated cyclobutyl moiety.

8. The humidifier of claim 1 wherein the polymeric membrane comprises polymer segments 4 and 5:

$$\underset{R_8(Z_1)_d}{\overset{E_1\text{-}P_1\text{-}Q_1\text{-}P_2}{|}} \qquad 4$$

$$E_2\text{-}P_3\text{-}Q_2\text{-}P_4 \qquad 5$$

wherein:
    $Z_1$ is —SO$_2$X, —PO$_3$H$_2$, or —COX;
    $E_1$, $E_2$ are each independently an aromatic-containing and/or aliphatic-containing moiety;
    X is an —OH, a halogen, an ester, or $$-\underset{\underset{H}{|}}{N}-\underset{\underset{O}{\|}}{\overset{\overset{O}{\|}}{S}}-R_4;$$

d is the number of $Z_1$ attached to $R_8$;
$P_1$, $P_2$, $P_3$, $P_4$ are each independently absent, —O—, —S—, —SO—, —CO—, —SO$_2$—, —NH—, NR$_2$—, or —R$_3$—;
$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and

$Q_1$, $Q_2$ are each independently a fluorinated cyclobutyl moiety.

9. The humidifier of claim 1 wherein the polymeric membrane comprises polymer segments 2 and 3:

(6)

(7)

connected by a linking group $L_1$ to form polymer units 8 and 9:

(8)

(9)

wherein:

$Z_1$ is —$SO_2X$, —$PO_3H_2$, or —COX;

$E_1$ is an aromatic-containing moiety;

$E_2$ is an unsulfonated aromatic-containing and/or aliphatic-containing moiety;

$L_1$ is a linking group;

X is an —OH, a halogen, an ester, or d is a number of $Z_1$ functional groups attached to $E_1$;

$P_1$, $P_2$, $P_3$, $P_4$ are each independently absent, —O—, —S—, —SO—, —$SO_2$—, —CO—, —NH—, $NR_2$—, or —$R_3$—;

$R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing the repetition of polymer segment 6; and j is a number representing the repetition of polymer segment 7.

10. The humidifier of claim 1 wherein the polymeric membrane comprises polymer segments 10 and 11:

(10)

(11)

wherein:

$Z_1$ is —$SO_2X$, —$PO_3H_2$, or —COX;

$E_1$, $E_2$ are each independently an aromatic or aliphatic-containing moiety wherein at least one of $E_1$ and $E_2$ includes an aromatic substituted with $Z_1$;

X is an —OH, a halogen, an ester, or d is the number of $Z_1$ functional groups attached to $E_1$;

f is the number of $Z_1$ functional groups attached to $E_2$;

$P_1$, $P_2$, $P_3$ are each independently absent, —O—, —S—, —SO—, —$SO_2$—, —CO—, —NH—, $NR_2$—, or —$R_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety, with the proviso that when d is greater than zero, f is zero and when f is greater than zero, d is zero.

11. The humidifier of claim 1 wherein the polymeric membrane further comprises a second polymer that is blended with the first polymer to form a polymeric blend.

12. The humidifier of claim 11 wherein the second polymer is a fluoroelastomer.

13. The humidifier of claim 11 wherein the second polymer is PFSA polymer.

14. The humidifier of claim 11 wherein the first polymer is present in an amount from about 30 to about 95 weight percent of the total weight of the polymeric blend.

15. A fuel cell system comprising:
a fuel cell stack having a cathode side and an anode side;
a membrane humidifier comprising:
a first flow field plate adapted to receive a first gas from the cathode side of the fuel cell stack;
a second flow field plate adapted to facilitate flow of a second gas thereto; and
a polymeric membrane disposed between the first and second flow fields, the membrane adapted to permit transfer of water, the polymeric membrane comprising a first polymer having a polymer segment comprising polymer segment 1:

(1)

wherein:

$E_o$ is moiety having a protogenic group;

$P_1$, $P_2$ are each independently absent, —O—, —S—, —SO—, —CO—, —$SO_2$—, —NH—, $NR_2$—, or —$R_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkylether, or $C_{1-25}$ arylene; and $Q_1$ is a fluorinated cyclobutyl moiety.

16. The fuel cell system of claim 15 wherein the first gas and the second gas include a component selected from the group consisting of $O_2$, $N_2$, $H_2O$, $H_2$, and combinations thereof.

17. The fuel cell system of claim 15 wherein the polymeric membrane has a permeance of greater than 6000 GPU.

18. The fuel cell system of claim 15 the first flow field plate and the second flow field plate each independently include a peripheral sealing section.

19. The fuel cell system of claim 15 wherein polymer segment 1 is repeated from 1 to 10,000 times.

20. The fuel cell system of claim 15 wherein the protogenic group is —SO$_2$X, —PO$_3$H$_2$, or —COX;

X is an —OH, a halogen, an ester, or

R$_4$ is trifluoromethyl, C$_{1-25}$ alkyl, C$_{1-25}$ perfluoroalkylene, C$_{1-25}$ aryl, or E$_1$.

21. The humidifier of claim 6 wherein d is from 0 to 4; and E$_1$ is selected from the group consisting of:

-continued and

22. A humidifier as in one of claims 7-10, wherein E$_1$ and E$_2$ are each independently selected from the group consisting of:

-continued

;

; and